United States Patent [19]

Spaeth et al.

[11] Patent Number: 5,299,046

[45] Date of Patent: Mar. 29, 1994

[54] SELF-SUFFICIENT PHOTON-DRIVEN COMPONENT

[75] Inventors: Werner Spaeth, Holzkirchen; Joachim Melbert, Steinhoering, both of Fed. Rep. of Germany

[73] Assignee: Siemens Aktiengesellschaft, Munich, Fed. Rep. of Germany

[21] Appl. No.: 945,596

[22] Filed: Sep. 16, 1992

Related U.S. Application Data

[63] Continuation of Ser. No. 490,454, Mar. 8, 1990, abandoned.

[30] Foreign Application Priority Data

Mar. 17, 1989 [EP] European Pat. Off. ........ 89104788.8

[51] Int. Cl.$^5$ ............................................ H04B 10/00
[52] U.S. Cl. ................................. 359/154; 359/142; 359/163; 257/679
[58] Field of Search ............... 359/142, 154, 163, 164, 359/168; 257/679

[56] References Cited

U.S. PATENT DOCUMENTS

| | | | |
|---|---|---|---|
| 4,581,716 | 4/1986 | Kzmyia | 364/900 |
| 4,742,573 | 5/1988 | Popovic | 455/605 |
| 4,814,849 | 3/1989 | Schrenk | 257/679 |
| 4,820,916 | 4/1989 | Patriquin | 455/605 |
| 4,939,793 | 7/1990 | Stewart | 455/605 |
| 4,941,205 | 7/1990 | Horst | 455/605 |
| 4,985,621 | 1/1991 | Aull | 455/605 |
| 4,998,294 | 3/1991 | Banks | 455/605 |

FOREIGN PATENT DOCUMENTS

| | | | |
|---|---|---|---|
| 0056064 | 7/1982 | European Pat. Off. | G06K 19/06 |
| 3047322 | 7/1982 | Fed. Rep. of Germany | G06K 7/10 |
| 2478849 | 9/1981 | France | G06K 19/00 |
| 60-225289 | 11/1985 | Japan | G06K 19/00 |

OTHER PUBLICATIONS

Kapon E., et al "Small optically driven power source", Applied Optics, vol. 27, No. 15, Aug. 1988, p. 3141.

*Primary Examiner*—Richard E. Chilcot, Jr.
*Assistant Examiner*—K. Negash
*Attorney, Agent, or Firm*—Hill, Steadman & Simpson

[57] ABSTRACT

A signal transmission protected against undesired querying is made possible with a photon-driven component and the energy supply is independent of external electrical connection. A photon-driven device has a light-receiving, monolithic semiconductor component for receiving optical energy and an optical signal for conversion into electrical energy and an electrical signal and has a light-transmitting semiconductor component for converting the electrical signal into an optical signal and for transmitting the optical signal. A radiation source for producing the optical energy and the optical signal and an optical receiver for the output optical signal from the photon-driven component are provided in a device for reading the information carried by the optical signal and produced in an electrical circuit connected to, powered by and operated by the photon-driven semiconductor component.

19 Claims, 7 Drawing Sheets

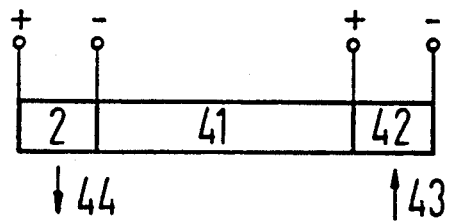
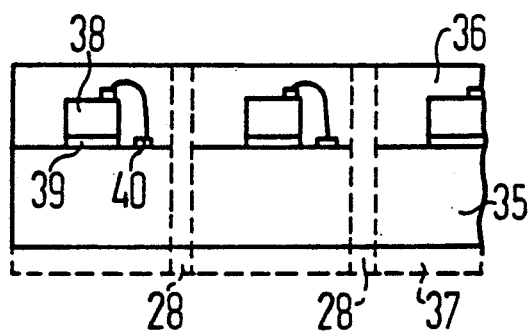
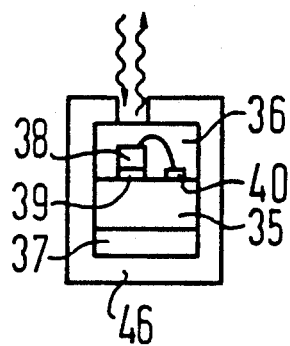
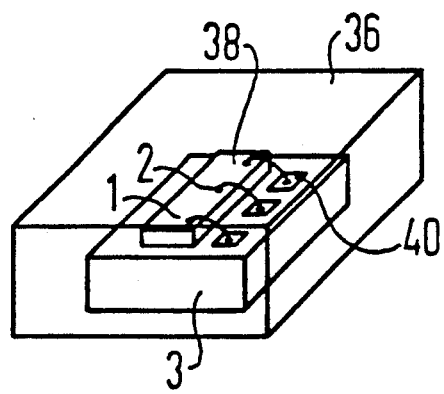
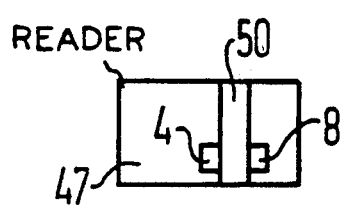
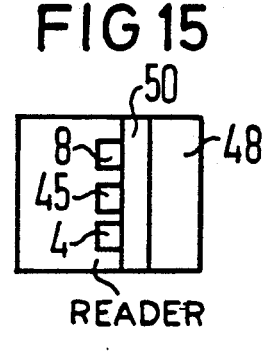
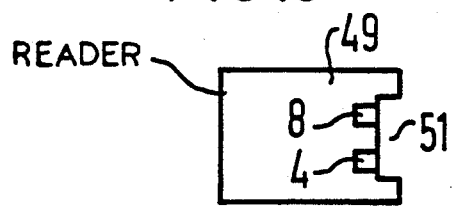

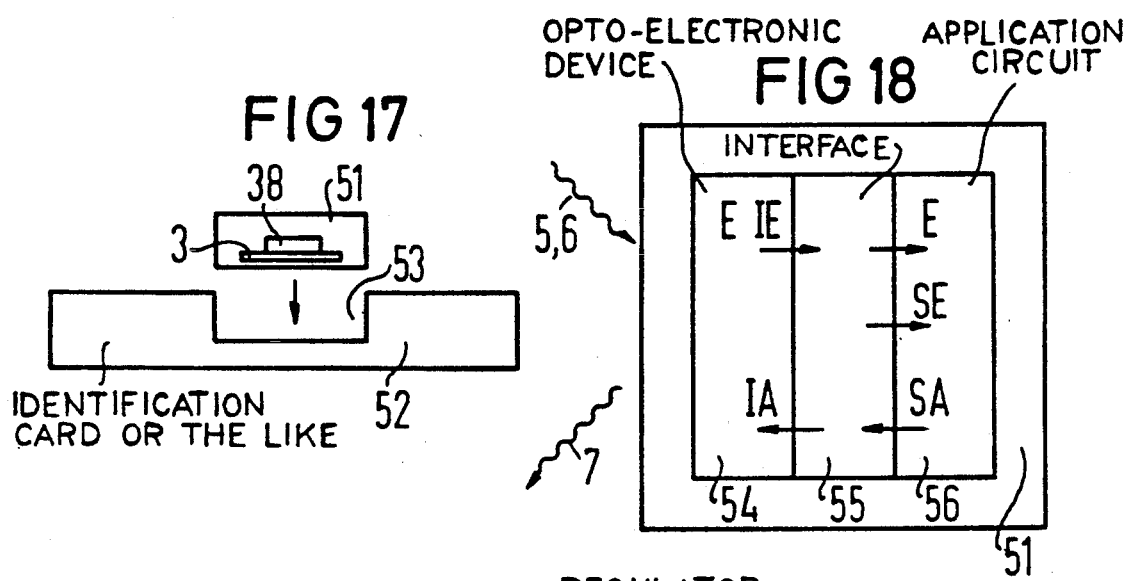
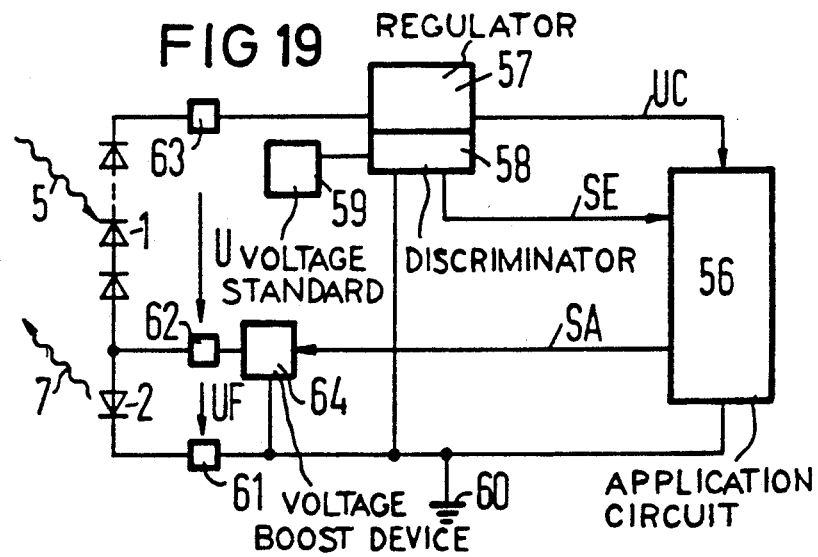
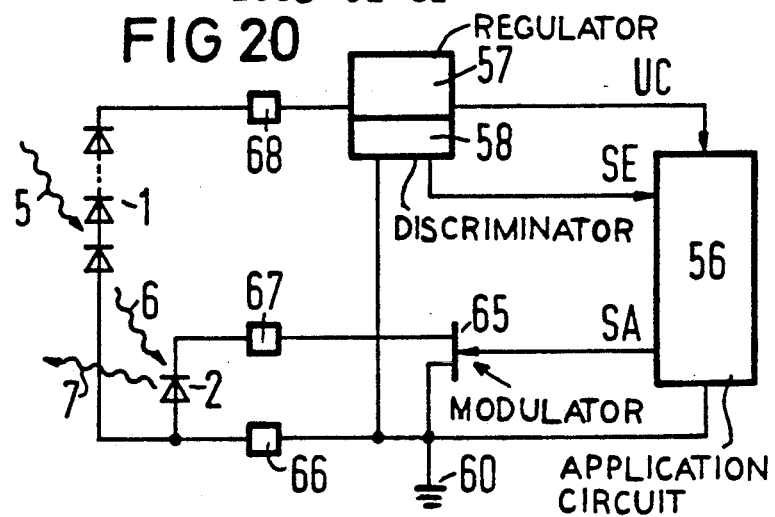

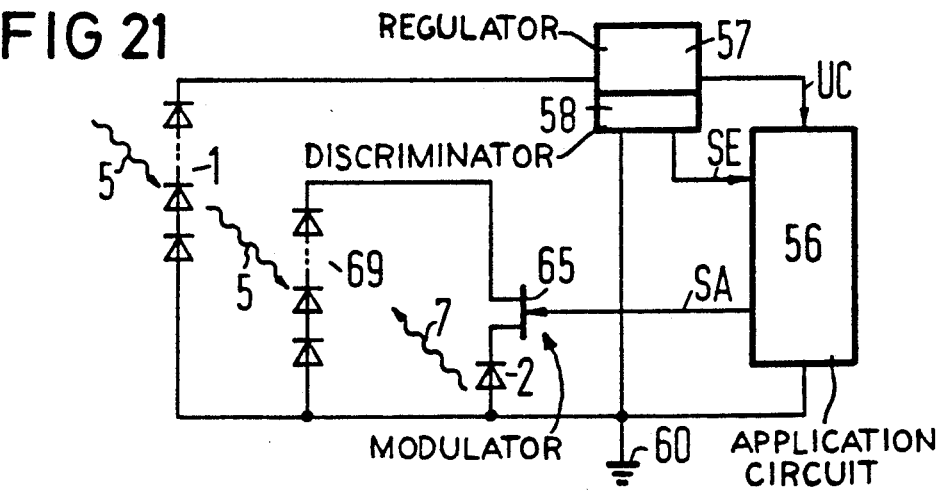
FIG 21
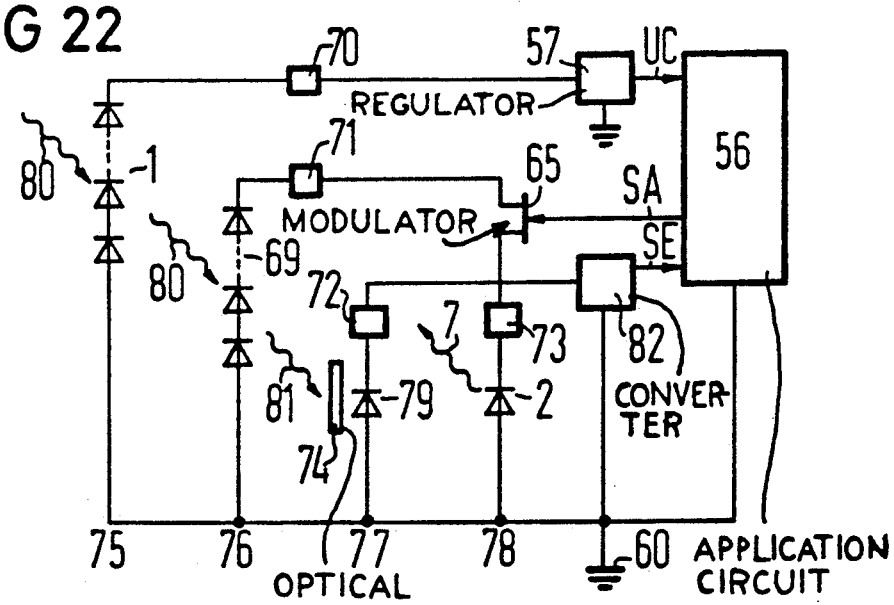
FIG 22
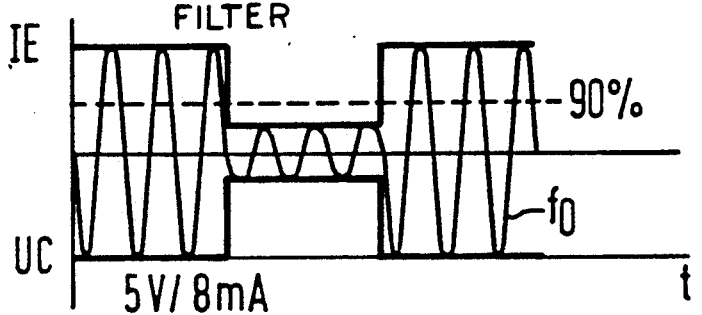
FIG 23

SELF-SUFFICIENT PHOTON-DRIVEN COMPONENT

This is a continuation of application Ser. No. 490,454, filed Mar. 8, 1990, now abandoned.

BACKGROUND OF THE INVENTION

1. Field of the Invention:

The present invention relates to energy and signal transmission devices and more particularly to photon-driven components.

2. Description of the Prior Art

In known components, the energy and signal transmission occur on the basis of electrical contacts. An inductive or radio frequency transmission is also known. A disadvantage of such known components is that the transmitted information can be easily overheard or monitored.

SUMMARY OF THE INVENTION

The object of the present invention is to provide a component that has a high resistance to disturbance.

According to the present invention, the above object is achieved in a photon-driven component which comprises a light-receiving monolithic semiconductor component device for the reception of optical energy and of optical signals for conversion into electrical energy and electrical signals and comprising a light-transmitting semiconductor component device for conversion of an electrical signal into an optical signal and for outputting an optical signal.

The present invention is directed to a, preferably monolithic opto-electronic component which can simultaneously convert optical energy and optical signals into electrical energy and electrical signals and, vice versa, can convert electrical signals into optical signals and which, in combination with an electronic circuit that can be connected on the same substrate in integrated form or on another substrate in discrete or hybrid form via ohmic connections, represents a self-sufficient unit that requires no electrical terminals toward the exterior for energy supply and signal transmission. The jobs of energy supply and signal transmission, in a component constructed in accordance with the present invention, are exclusively handled by photon currents in the direction to the component and in a direction from the component.

The realization of a component constructed in accordance with the present invention preferably occurs in the form of an array of diodes that are connected in series and/or parallel and are fashioned as photo diodes and that are therefore in the position to convert optical energy and optical signals into electrical energy and electrical signals, and of a diode that, as a light-emitting diode, converts electrical signals into optical signals.

Any device that is in the position, with the assistance of semiconductor material, to convert optical energy and/or optical signals into electrical energy and/or electrical signals comes into consideration as such a type of light-receiving semiconductor component devices. The light-receiving semiconductor component device, therefore, can also contain a part that, preferably, converts optical energy into electrical energy and comprises a part that preferably converts optical signals into electrical signals.

Any device that is in the position, with the assistance of semiconductor material, to convert electrical signals into optical signals and to output optical signals from the component comes into consideration as such a light-transmitting semiconductor component device.

Devices that comprise transistors and/or thyristors also come into consideration as light-receiving semiconductor component devices.

Any device that can process the signal incident onto the component that has been converted into an electrical signal in some form and that can output an electrical signal to the light-transmitting semiconductor component device as a result of this processing for conversion of this electrical signal output by the electrical circuit into an optical signal and for outputting this optical signal to the outside away from the component comes into consideration as the electrical circuit or as a part of the electrical circuit.

An integrated circuit can be employed as the electrical circuit.

For example, a signal that is input into the self-sufficient component and that is coded in a defined fashion can be processed with the assistance of the electrical circuit. An integrated electrical circuit can be employed for this purpose.

The electrical signal, however, can also be simply processed only with the assistance of a pulse-shaping device. It is sufficient in the extreme case that an adequately-defined time delay appears after an optical signal is input into the self-sufficient component until the optical signal to be emitted by the self-sufficient component is output. Such a signal processing can be carried out with the assistance of certain delay devices.

A self-sufficient component constructed in accordance with the present invention is reliable against static charges, against electromagnetic fields, against undesired interrogation on the basis of electrical contacting or by measuring the electromagnetic radiation given inductive drive, and against wear (no electrical contacts).

A self-sufficient component constructed in accordance with the present invention is preferably employed for an electronic key, for a check card, for a telephone card, for identification cards, for marking goods with the assistance of numbers or prices via readout at a cash register. A self-sufficient component constructed in accordance with the present invention is employed as a device for identifying persons or articles or an authorization or a price or to communicate any information concerning a specific entity.

All the more electrical energy can be available for the operation of an electrical circuit the more energy is optically input into the self-sufficient component. All the less optical energy must be input into the self-sufficient component, the less electrical energy an electrical circuit requires. Inputting optical radiation into the self-sufficient component can occur with the assistance of a single light source or with the assistance of at least two light sources. For example, optical energy can be beamed in predominantly with a first light source and an optical signal can be input into the self-sufficient component with a second light source. Compound semiconductors preferably come into consideration as semiconductor material for the light-receiving semiconductor device and for the light-transmitting semiconductor component device. III-V semiconductors such as GaP, GaAs, InP, II-VI semiconductors and the ternary and quaternary semiconductor systems that can be formed with these semiconductors therefore come into consideration as the semiconductor material.

BRIEF DESCRIPTION OF THE DRAWINGS

Other objects, features and advantages of the invention, its organization, construction and operation will be best understood from the following detailed description, taken in conjunction with the accompanying drawings, on which:

FIG. 10 is a schematic representation of the structure of a seventh execution of a photo-driven component constructed in accordance with the present invention;

FIG. 11 is a schematic representation of the structure of a self-sufficient photon-driven component constructed in accordance with the present invention;

FIG. 12 is a schematic representation of the structure of another self-sufficient photon-driven component constructed in accordance with the present invention;

FIG. 13 is a schematic representation of the structure of still another self-sufficient photon-driven component constructed in accordance with the present invention;

FIG. 14 is a schematic representation showing a reader for using an information member containing a self-sufficient photon-driven component constructed in accordance with the present invention;

FIG. 15 is a schematic representation illustrating another reader for using an information member containing a self-sufficient photon-driven component constructed in accordance with the present invention;

FIG. 16 is a schematic representation showing still another reader for using an information member containing a self-sufficient photon-driven component constructed in accordance with the present invention;

FIG. 17 is a schematic representation showing still another reader for using an information member containing a self-sufficient photon-driven component constructed in accordance with the present invention;

FIG. 18 is a schematic representation showing the energy and signal conversion aspects of the operation of a self-sufficient photon-driven component constructed in accordance with the present invention;

FIG. 19 is a schematic circuit diagram of an electrical circuit of a self-sufficient photon-driven component constructed in accordance with the present invention;

FIG. 20 is a schematic circuit diagram of an electrical circuit of a self-sufficient photon-driven component constructed in accordance with the present invention;

FIG. 21 is a schematic circuit diagram of another electrical circuit of a self-sufficient photon-driven component constructed in accordance with the present invention;

FIG. 22 is a schematic circuit diagram of another electrical circuit of a self-sufficient photon-driven component constructed in accordance with the present invention;

FIG. 23 is a graphic illustration of an electrical signal appearing at the output of a light-receiving semiconductor device, the signal being amplitude modulated and having a fundamental frequency $f_0$ and a resulting electrical digital input signal for generating an optical signal;

DESCRIPTION OF THE PREFERRED EMBODIMENTS

Figure 1:
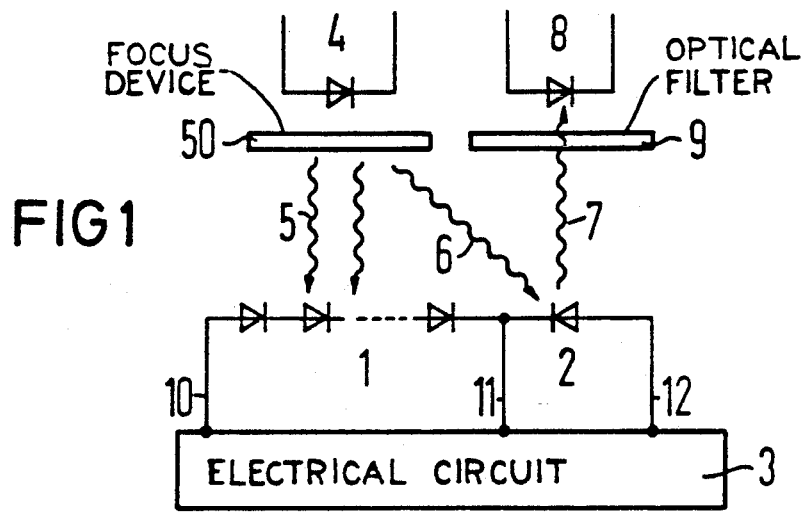
FIG. 1 is a schematic representation illustrating the principles of the invention.

Referring to FIG. 1, the principle of the invention is set forth. A photon-driven component comprises a light-receiving semiconductor device 1 for receiving optical energy and an optical signal for conversion into electrical energy and into an electrical signal and comprises a light-transmitting semiconductor component device 2 for converting an electrical signal into an optical signal and for outputting an optical signal.

Such a photon-driven component comprising two devices 1 and 2 can be manufactured and sold by itself and can be electrically connected to an electrical circuit 3. At least one light source 4 emits an optical radiation 5 that is focused or expanded with a device 50. The optical radiation comprises both optical energy as well as an optical signal. In the most simple case, the optical energy can be modulated with an optical signal given use of a single semiconductor laser as a radiation source 4. In addition thereto, one source can preferably output optical energy and one source can preferably output an optical signal given utilization of two sources for optical radiation.

The light-receiving semiconductor component device 1 can be composed of an array of photodiodes. The light-receiving semiconductor component 1 converts the optical radiation 5 into electrical energy and an electrical signal. The electrical energy and the electrical signal can be taken at the contacts 10, 11 of the light-receiving semiconductor component device 1. The electrical circuit 3 is operated with this electrical energy. The electrical signal that has been received at the contacts 10, 11 is processed by the electrical circuit 3. As a result of this processing, the electrical circuit 3 outputs an electrical information signal at the contacts 11, 12 of the light-transmitting semiconductor component device 2. The light-transmitting semiconductor component device 2 converts this signal output at the contacts 11, 12 into an optical information signal and outputs this optical information signal 7 to a photodetector 8. An optical filter 9 can be applied between the light-transmitting semiconductor component device 2 and the photodetector 8. The optical filter 9 can suppress optical disturbances. The optical filter 9, however, can also see to it that the optical information signal 7 proceeds to the photodetector 8 as a valid signal only when its optical radiation has a defined spectrum.

When the optical radiation 5 has an accurately-defined spectrum and when the optical information signal 7 can proceed to the photodetector 8 only when the optical radiation of the optical information signal 7 has an accurately-defined spectrum, an electrical circuit 3 can be completely omitted in the extreme case. The photon-driven component, however, must then be designed such that an optical signal 7 having an accurately-defined spectrum is only output given input of a defined optical radiation 5 having an accurately-defined spectrum.

The light-transmitting semiconductor device 2 can be supplied with electrical energy by the light-receiving semiconductor component 1. The result thereof, however, is that less electrical energy is available for the electrical circuit 3 when sending the optical radiation 7 and that precautions must then be undertaken in this case on the basis of a special design of the electrical circuit 3 or of the device 1, for example, by employing a charge-storing device. This can be avoided when the light-transmitting semiconductor component device 2 is also supplied with another optical radiation 6 from the radiation source 4. As a result thereof, charge carriers are photoelectrically generated in the light-transmitting semiconductor component device 2, the charge carriers being capable of being directly used for generating the optical radiation 7. When, for example, the light-emitting diode 2 is operated with no load, then the charge carriers photoelectrically generated in the light-transmitting diode 2 cannot flow off and the electron-hole pairs photoelectrically generated in the volume of the light-emitting diode 2 recombine to a great extent. When, on the other hand, the light-emitting diode 2 is operated, for example, in a short-circuit manner, then the electron-hole pairs photoelectrically generated in the light-emitting diode 2 can be separated to a large extent by the internal electrical field and can flow off, so that only a slight part of the electron-hole pairs can then recombine. By alternately switching the operating condition of the light-emitting diode 2 from no-load operation to short-circuit operation of the light-emitting diode 2, for example, a modulation of the emitted optical radiation 7 is possible. In general, however, the emitted radiation 7 can also be modulated by merely changing the terminating impedance. The size of the emitted optical radiation 7 is thereby dependent on the quantity of charge carriers photoelectrically generated in the light-emitting diode 2, i.e. on the size of the optical radiation 6 absorbed in the volume of the light-emitting diode 2.

On the basis of a suitable design of the light-transmitting semiconductor component device 2, such a modulation of the operating condition of this light-transmitting semiconductor component device 2 can occur not only between no-load operation and short-circuit operation, but can also occur between different operating conditions in the region between short-circuit and no-load condition. The intensity of the optical radiation 7 output by the light-transmitting semiconductor component device 2 can be modulated in this manner. This modulation of the intensity of the optical radiation 7 occurs with the assistance of the electrical circuit 3.

When the optical filter 9 allows the optical radiation 7 to pass through only beginning with an accurately-defined intensity, an additional, simple discrimination can be achieved for analyzing the validity of the optical radiation 7.

Figure 2:
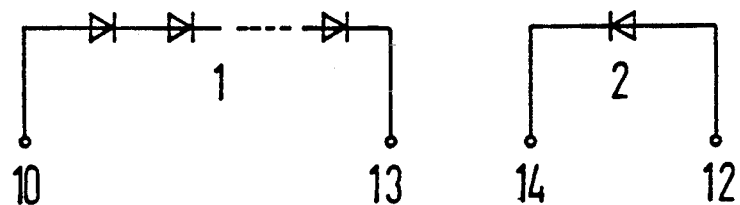
FIG. 2 is a circuit diagram showing the electrical connections within a self-sufficient component constructed in accordance with the present invention.
Figure 3:
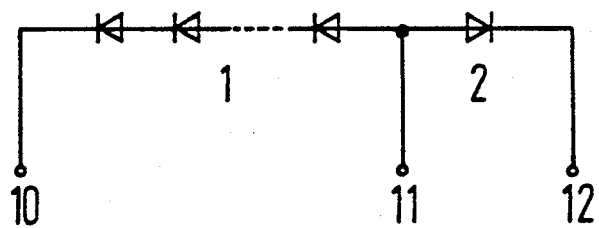
FIG. 3 is a schematic circuit diagram showing the electrical connections within another self-sufficient component constructed in accordance with the present invention.

FIGS. 2 and 3 explain various possibilities for the internal connections within a self-sufficient photon-driven component.

In FIG. 2, four electrical terminals 10, 12, 13, 14 are provided for the electrical connection of the photon-driven component to an electrical circuit 3. The light-receiving semiconductor component device 1 thereby has the two contacts 10, 13 and the light-transmitting semiconductor component device 2 has the two contacts 12, 14.

In FIG. 3, the light-receiving semiconductor component device 1 and the light-transmitting semiconductor component device 2 are connected in series so that the anodes of the photo array 1 and of the light-emitting diode 2 are directly connected to one another. An electrical contact 11 is taken between the two anodes of the light-receiving semiconductor component device 1 and the light-transmitting semiconductor component device 2. Three contacts 10, 11, 12 are therefore available for the electrical circuit 3 in a photon-driven component of FIG. 3.

FIGS. 4–10 explain exemplary embodiments of the photon-driven component.

Figure 4:
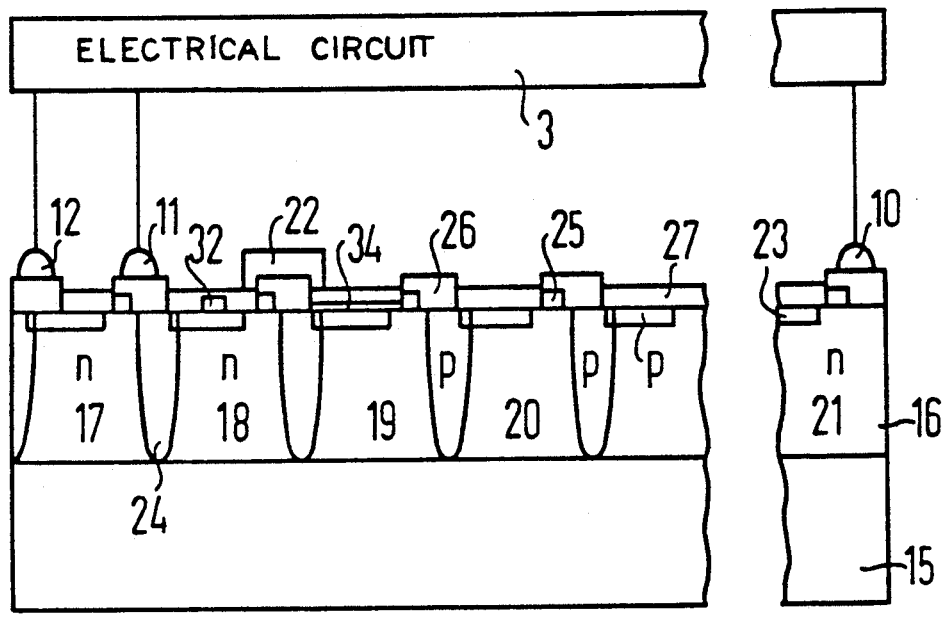
FIG. 4 is a schematic representation showing the structure of a first execution of a photo-driven component constructed in accordance with the present invention.
Figure 5:
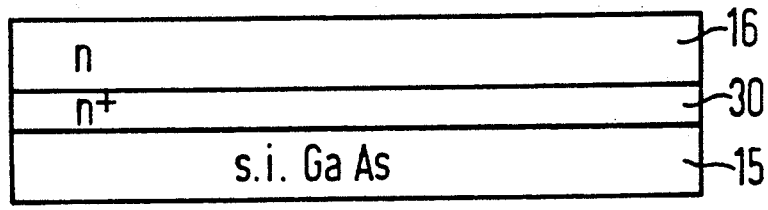
FIG. 5 is a schematic representation illustrating the structure of a second execution of a photo-driven component constructed in accordance with the present invention.
Figure 6:
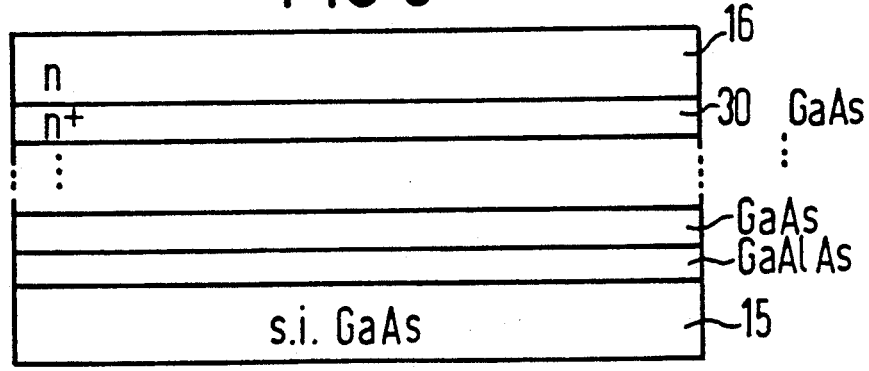
FIG. 6 is a schematic representation illustrating the structure of a third execution of a photo-driven component constructed in accordance with the present invention.

In FIG. 4, an n-conductive layer 16 having a layer thickness in the micrometer range, particularly having a layer thickness between 1 and 10 micrometers, is applied onto a semi-insulating gallium arsenide substrate 15, the n-conductive layer 16 being divided into individual zones by a parting etching 29 (FIG. 8) or by a p-parting diffusion 24. The individual zones 18–21 are made into photodiodes by an additional, shallow, second p diffusion. A photo-element array 1 that acts as a power source having a defined yield dependent on the area and on the plurality of the photodiode elements and dependent on the size of the power per unit area of the optical radiation 5 is obtained by series connection of these photodiodes with the assistance of metallic or other conductive frames (composed, for example, of highly-doped polysilicon) and with the assistance of an optical shielding 22 of the parting diffusion 24 against the incident optical radiation 5 in order to avoid optical shorts. A diode of the array having the zone 17 is fashioned as a light-emitting diode 2 having two electrical terminals 11, 12 whereby the anode of the array 1 with the anode of the light-emitting diode 2 comprise the common contact 11 or whereby the cathode of the array 1 and the cathode of the light-emitting diode 2 comprise the common contact 11.

In order to reduce the bulk resistance an n+ layer 30 (FIGS. 5 and 6) having a doping greater than $10^{17}$ cm$^{-3}$ can be applied between the substrate 15 and the D layer 16. A reduction in the bulk resistance can also occur with the assistance of additional metalizations 32 (FIG. 4) on the p side of the diodes.

In order to increase the reflection proceeding from the substrate 15 and, therefore, in order to enhance the efficiency of the photon-driven component and/or in order to reduce the thickness of the layer 16, a dielectric mirror 31 of λ/4 can be additionally applied directly onto the surface 15 beneath the n layer 16 or, respectively, under the n+ layer 30. Such λ/4 layers can be alternating layers of GaAs/GaAlAs or of GaAs/AlAs. A reflective device, for example, a metallic mirror or a dielectric mirror can also be present under a transparent substrate.

The layer 16 can be an epitaxial layer having a doping of between $10^{16}$cm$^{-3}$ and $10^{18}$cm$^{-3}$. A p-doped GaAs substrate can be employed as the substrate 15. According to FIG. 8, the division of the individual diodes 1, 2 can occur on the basis of etched trenches 29 down to the substrate 15.

In FIG. 4, the division of the layer 16 into different zones 17-21 has occurred on the basis of a parting diffusion 24. In order to avoid an optical short in this case, the region above the parting diffusion 24 is advantageously optically shielded with a layer 22. The layer 22 is advantageously composed of high-impedance semiconductor material of silicon or germanium.

In order to increase the optical efficiency, an anti-reflection layer 27 whose layer thickness amounts to λ/4 and that can be composed of $Al_2O_3$ or of $Si_3N_4$ is applied onto the light-sensitive surfaces of the light-receiving semiconductor components 1 and onto the light-transmitting surfaces of the light-transmitting components 2.

For better contacting to the n zones of the layer 16, a gold-germanium eutectic element 25 is provided on these n zones. A metallization 26 of aluminum suffices for contacting the p zones.

In order to reduce the surface recombination, a layer 34 of GaAlAs having a layer thickness of less than 0.1 micrometer can be applied onto the light-sensitive surfaces of the light-receiving components 1 and onto the light-transmitting surfaces of the light-transmitting components 2.

Figure 7:
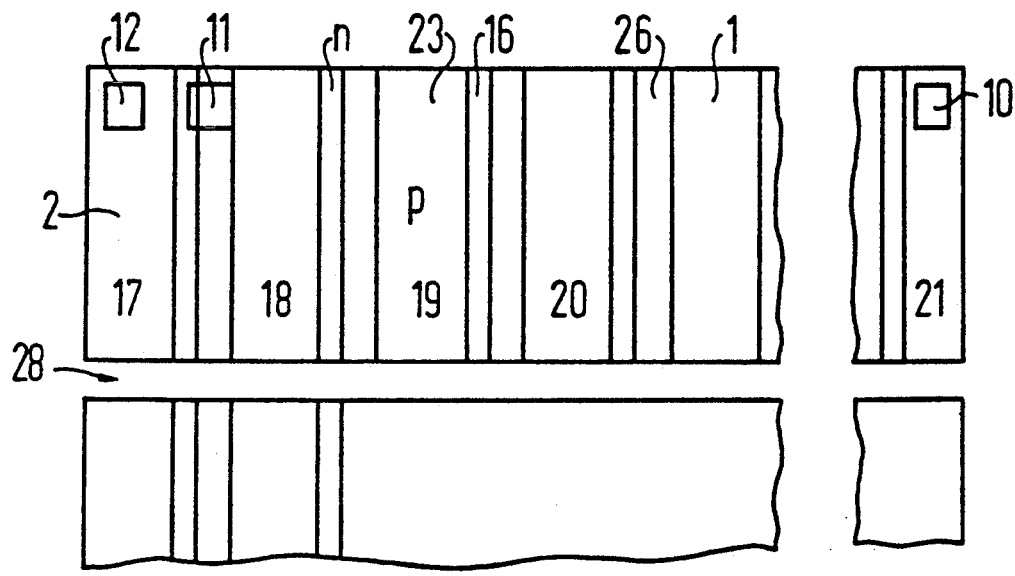
FIG. 7 is a schematic representation of the structure of a fourth execution of a photo-driven component constructed in accordance with the present invention.
Figure 8:
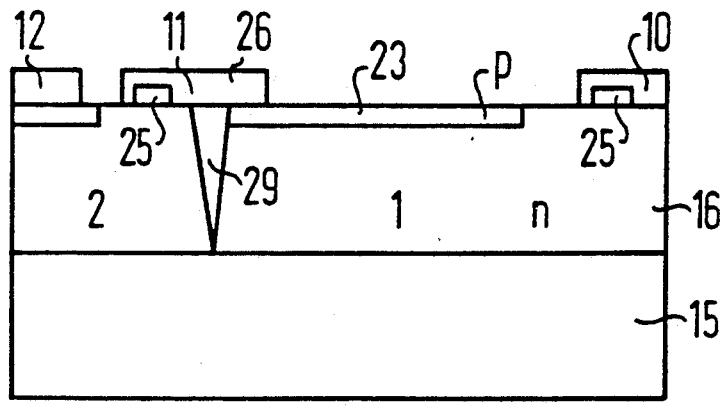
FIG. 8 is a schematic representation of the structure of a fifth execution of a photo-driven component constructed in accordance with the present invention.

A plurality of photon-driven components can be simultaneously produced on a semiconductor wafer. The division of such a semiconductor wafer can occur in "pieces of pie" or linearly. Given the division into "pieces of pie", the photon-driven components can have the shape of arcuate sectors. Given such a pie-shaped division, the p zones deriving from the parting diffusion 24 must be removed by etching at the edges of the divided, photo-driven components. FIG. 7 shows the division of a semiconductor wafer into linear photo-driven components with the assistance of a saw cut 28 and subsequent damage etching.

Dependent on the application, the one or the other geometrical shape of the photon-driven component, as acquired by dividing a semiconductor wafer, can be advantageous. Comb structures are also conceivable in order to compensate spatially-unequal illumination of the photo diodes.

Figure 9:
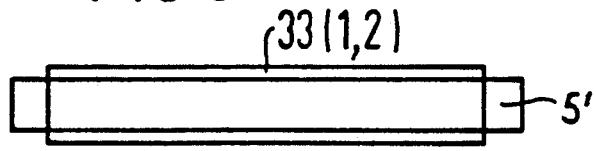
FIG. 9 is a schematic representation of the structure of a sixth execution of a photo-driven component constructed in accordance with the present invention.

The linear shape is advantageous when the optical radiation 5 can be focused (concentrated) "line-shaped" with the assistance of a device 50 (FIG. 1). This is set forth with reference to FIG. 9. FIG. 9 shows a spatially-rectangular, linear photo-driven component 33 and a rectangular-focused optical beam 5' that is incident onto the component 33. An especially high exploitation of the radiant power thereby occurs. The movement of the beam 5' in the lateral direction of the component 33 has a high tolerance. Losses only occur where the beam 5' extends beyond the component 33 in the longitudinal direction. These optical losses can be kept at a minimum. Geometrical lateral tolerances of the optical arrangement can be intercepted relatively well over the width of the component 33. Longitudinal tolerances can be minimized via the lengths of the component 33 and/or of the beam 5'.

A cylindrical or spherical lens or a combination of cylindrical or spherical lenses can be employed directly in front of the optical radiator 4 as the imaging element 50 (FIG. 1). The optical radiation 5 can therefore be fashioned into a strip having a length of 1-2mm and a width from a few micrometers up to several hundred micrometers. FIG. 10 illustrates a photon-driven component wherein the light-receiving semiconductor component device 1 comprises a part 41 and a part 42. The part 41 (array) thereby has the privileged task of converting optical energy into electrical energy. The part 42 (photodiode) has the privileged task of converting an optical signal into an electrical signal. The data input is referenced 43 and the data output is referenced 44.

A compact structure is advantageous for the utilization of a photon-driven component in electronic keys, for a chip card, for price labels, for identification of persons, animals and articles, etc. This can occur in such a form that, according to FIG. 11, the photoelectric component 38 is placed "piggyback" onto an integrated circuit 35 by wire bonds and via contacts 40. When the photochip 38 is to be placed on the integrated circuit 35 with an extremely accurate position, then it is advantageous when solder pads 39 (FIG. 12) having an accurately-defined solder thickness and geometrical dimensions that correspond to the photochip 38 are applied onto the integrated circuit 35. The photochips 38 are put in place onto the solder pads 39 and are fixed with the assistance of a fluxing agent. The semiconductor wafer in which the integrated circuits 35 have been fashioned in union is brought to the soldering temperature. The photochips 38 thereby swim in the molten solder into the position prescribe by the solder pads 39 in a self-adjusting fashion and are fixed in this position when cooled. The wire bonds from the photochips 38 to the contacts 40 can be executed thereafter. Given a transparent substrate (for example InP) of the photon-driven component 38, the connection to the electrical circuit 3 can occur upside-down (face down) without wire by direct contacting. The semiconductor wafer having the integrated circuits 35 and having the photochips 38 soldered thereon and bonded thereto can be covered on the front side and, this being advantageous because of mechanical distortions, on the rear side as well with a planar, parallel layer 36 of, for example, material that is transparent for the optical radiation 5 (LED or, respectively, laser diode emission). This coated semiconductor wafer can then be divided into individual "hybrid" chips with the assistance of a standard parting technique, for example with a saw cut 28. These "hybrid" chips, for example, can then be introduced into depression provided in chip cards, price labels, electronic keys, etc. Carrier and the housing for the self-sufficient component is eliminated in this manner.

FIG. 12 illustrates a finished self-sufficient component. This finished self-sufficient component also has a layer 37 of, for example, plastic on its rear side. The entire self-sufficient component is optically sealed with a layer 46, including a gap for the photon operation. The layer 46 can be composed of selenium. The layer 46 can also be optically transparent.

FIG. 14-16 explain the utilization of self-sufficient photon-driven component constructed in accordance with the present invention in different reading apparatus 47–49. Each of the reading apparatus have a radiation source 4 and a radiation detector 8. The apparatus 48 has an additional radiation source 45. The apparatus 47 and 48 each have slots 50 into which an information member provided with a self-sufficient photon-driven component of the present invention can be introduced with the elements 4 and 8 in the side walls of the slot 50. In the case of the apparatus 49, a device provided with a self-sufficient photon-driven component of the present invention can be placed into a depression 51 which has the radiator 4 and the detector 8 in the bottom wall thereof. Given the reading apparatus 47, a radiator 4 and a detector 8 are arranged in respective walls at different, opposite sides of the slot 50.

A high-power GaAlAs laser having powers from a few tens of mW up to a few W in the wavelength range from 780 nm–through 870 nm can be advantageously used as the radiation source 4. The penetration depth of the radiation into the GaAs is very slight (a few micrometers), so that extremely thin epitaxial layers 16 are adequate. The thickness of the epitaxial layer 16 can amount to less than 5 micrometers. Little area is therefore required for the parting diffusion 24 because the lateral diffusion outwardly thereby occurring is slight.

A high-power laser diode 4 can be simply operated as a CW radiation source on which a modulated signal can be placed. At the same time, an extremely compact structure can be realized here with a laser diode in a T018, T05 housing. At the same time, the optical beam 5 can be easily focused onto circular areas having diameters of less than 5 mm–0.1 mm and onto strips having a length of less than 2 mm and a width of less than 0.1 mm with the assistance of cylindrical lenses and/or spherical lenses, when the application so requires. It is therefore possible for the self-sufficient photon-driven component of the present invention to be executed extremely small and, therefore, in an extremely cost-effective manner. A photon-driven component of the present invention can comprise an area of $0.5 \times 1.3$ mm$^2$ with, for example, six photodiodes and one light-emitting diode given an irradiation of 200 mW. The light-receiving semiconductor component device 1 therefore delivers a voltage of about 5.5 V given a current of 6–10 mA. The slight spectral width of the laser diode of less than 5 nm allows a good separation between the wavelength of the laser diode (780 nm–870 nm) and the wavelength of the light-emitting diode (peak wavelength between about 880 nm and 910 nm). A self-sufficient photon-driven component constructed in accordance with the present invention is suitable for applications in which an electrical circuit or an integrated circuit is supplied with energy and information via photon currents with the assistance of this component and in which the electrical circuit, in turn, outputs an information toward the outside. The electrical circuit 3 and the element array have no electrical connection towards the outside, but are completely galvanically insulated towards the outside.

A self-sufficient photon-driven component constructed in accordance with the present invention can be fashioned extremely compact. In FIG. 11, for example, the thickness of the semiconductor wafer (the thickness of the integrated circuit 35) can amount to between 200 micrometers and 300 micrometers, the thickness of the layer 36 can amount to between 50 micrometers and 100 micrometers, and the width of a detached, self-sufficient photon-operated component can amount to between 100 micrometers and 200 micrometers.

A light-emitting diode 2 can also be operated in a time-division multiplex fashion, but as a photo receiver 42 as well as a light transmitter 2. This means that the light-emitting diode 2 accepts signals 43 at certain times and outputs signals 44 at other times.

A light-emitting diode that outputs light in the visible range can also be employed as a light-transmitting component in a photon-driven component of the present invention. For example, a light-emitting diode of GaAsP can be integrated on a substrate 15 of GaAs. Such a light-emitting diode having emission in the visible range can also be operated in a time-division multiplex manner as a light-transmitter and as a light-receiver as well and can receive signals 43, on the one hand, and output signals 44, on the other hand, in time-division multiplex operation. The light output by a light-emitting diode can be conducted out of the device in which the photon-driven component is embedded with the assistance of a light conductor.

A housing for a self-sufficient photon-driven component of FIG. 12 can be particularly beneficially manufactured on a large industrial scale when, in an arrangement of FIG. 11, the semiconductor wafer 35 only is first sawn through when the foil 36 is then stretched, when the semiconductor wafer 35 is then cast on proceeding from the rear side, advantageously with optically dense material, and when the final sawcut 28 is only undertaken at that time. The saw blade can thereby be narrower then the gap. An extremely high accuracy of the saw cut 28 is therefore achieved. No additional adjustment in view of the sawing is thereby required when the original ordering of the semiconductor wafer 35 is retained. After the stretching of the layer 36, parts of the semiconductor wafer that are sawn apart are, for example, at a distance of 500–200 mm away from one another. Sawing to exactly 10 mm can be carried out with such a process. A self-sufficient photon-driven component having extremely low geometrical tolerances is obtained in this manner.

The self-sufficient photon-driven component having the critical component parts 35, 38 of FIG. 12 is constructed, for example, in hybrid fashion. A self-sufficient photon-driven component that has the functions of the component parts 35, 38 can be produced by integration on a single substrate. A substrate composed of a compound semiconductor material can be employed as such a substrate and may advantageously comprise III-V semiconductor material including GaP, GaAs, InP, II-VI semiconductor material, ternary semiconductor material, and quaternary semiconductor material.

FIG. 13 illustrates in a perspective view, a self-sufficient photon-driven component comprising an electrical circuit 3 and a photon-driven component 38. The photon-driven component 38 has the light-receiving semiconductor component device 1 and the light-transmitting semiconductor component device 2. The photon-driven component 38 is electrically connected to the electrical circuit 3 via electrical contacts 39, 40. The entire self-sufficient photon-driven component can be provided with a transparent envelope 36 on all sides.

The light-receiving semiconductor component device 1 is preferably monolithically executed. Those component parts of the semiconductor component device 1 that receive optical energy and those component parts of the semiconductor component 1 that receive the optical signal are preferably of identical material structure. Preferably, optical energy is output focused onto the semiconductor component device 1 so that the semiconductor component device 1 can be fashioned with a small area. This focusing of the optical beam 5 can integrally occur in the optical radiator 4, or with the assistance of a device (lens) for focusing the beam.

A component of the invention is preferably employed for an article that serves the purpose of identifying some article or some person or some situation or some authorization. A component of the invention is preferably employed for a chip card, for a credit card, for personal identification papers, for a key, and in general as an identification or, respectively, authentication instrument, or in any information member which is to produce information signals concerning a specific entity.

According to FIG. 17, a self-sufficient photon-driven component 51 as shown in FIG. 13 can be introduced into a recess 53 of a carrier 52. The recess 53 can extend over the entire thickness of the carrier 52. The carrier 52 can be of plastic material as usually employed for plastic cards. The carrier 52, however, can also be composed of a material as is usually employed for identification of certain articles, goods, etc. An article 52 can serve for a transport routing system, for sorting mailed articles, for mailings, for warehousing or for calling goods from a warehouse. A carrier 52 can serve for identifying price, i.e. serve as a price tag.

FIG. 18 shows a self-sufficient photon-driven component 52 that receives radiation 5, 6 proceeding from the exterior thereof and outputs optical radiation 7 to the exterior thereof. This self-sufficient photon-driven component 51 contains an opto-electronic device 54, an application circuit 56 and an interface 55 between the opto-electronic device 54 and the application circuit 56. The opto-electronic device 54 contains a light-receiving semiconductor component device 1 for receiving optical energy and an optical signal for conversion into electrical energy E and an electrical signal IE and contains a light-transmitting semiconductor component device 2 for converting an electrical signal SA into an optical signal 7. The application circuit 56 receives electrical energy E, the electrical signal SE and outputs an electrical signal SA. The interface 55 sees to it that the application circuit 56 is supplied with electrical energy E and an electrical signal SE suitable for the application circuit and that the opto-electronic device 54 is supplied with an electrical (output) signal IA suitable for the opto-electronic device 54.

The light-transmitting semiconductor component device 2 can receive the energy that it requires for its operation from the light-receiving semiconductor component device 1 or can receive it directly from the optical radiation 6. Moreover, a light-receiving semiconductor component device for the reception of optical energy can be additionally provided that only serves the purpose of supplying energy to the light-transmitting semiconductor component device 2. For example, a part of the photodiode array 1 or a suitable photodiode array having two photodiode zones can serve this purpose.

The optical signal received by the light-receiving semiconductor component device 1 can be modulated. The optical signal 7 output by the light-transmitting semiconductor component device can also be modulated. A modulation of the optical signal can occur via a modulation of the amplitude, of the frequency or of the phase. Received optical signals and transmitted optical signals can be modulated in different ways.

The optical radiation 5 contains an energy part and a superimposed signal part. The superimposed signal part can be filtered out of the optical radiation 5 in any manner available to a person skilled in the art.

Any possibility available to a person skilled in the art, particularly any possibility known from chip cards or check card or telephone cards can be employed overall for the design of the interface 55.

In the most simple case, the incident optical radiation 5 is amplitude modulated. Again in the most simple case, the fundamental frequency $f_0$ of the incident optical radiation 5 can be employed for frequency modulation of the output optical radiation 7.

FIGS. 19–22 explain various possibilities for designing the opto-electronic device 54 and the interface 55.

FIG. 19 illustrates an embodiment of the opto-electronic device 54 and of the interface 55 for that case in which the light-transmitting semiconductor component device 2 draws the energy required for its operation from the light-receiving semiconductor component device 1. With the assistance of a regulator 57 and of a discriminator 58, a dc voltage UC is obtained from the voltage U for the voltage supply of the application circuit 56 and an electrical input signal SE is obtained therefrom for the signal input and for controlling the application circuit 56. A standard voltage 59 is connected to the discriminator 58 as a voltage reference. Depending on the type of modulation of the incident radiation 5, the voltage standard 59 can be an oscillator given frequency modulation, a combination of frequency normal with storage effect given phase modulation and a merely-prescribed reference voltage given amplitude modulation. The voltage standard 59 can be integrated in an application circuit 56. Given frequency modulation of the incident radiation 5, a phase-locked loop (PLL circuit) plus a memory can serve as a frequency standard.

The electrical input signal SE for the application circuit 56 can also contain a clock signal and reset signal as control signals.

Given fashioning of an autonomous photon-driven component with the assistance of n-channel field effect transistors, the lowest potential is the ground potential 60. Planarly-constructed pads 61–63 are employed for creating locations having defined potentials.

The application circuit 56 can also contain the regulator 57. Given a corresponding fashioning of the optical and electrical devices employed, the regulator 57 can also be entirely omitted.

In an arrangement of the type illustrated in FIG. 19, an additional voltage step UF can be handled in a manner available to one skilled in the art. For example, a device 64 can make the voltage step UF available for that case wherein the device 2 is not emitting optical radiation 7 at the moment. When the device 2 must output the optical radiation 7, the device 64 can then see to it that the optical radiation 7 is modulated with the electrical output signal SA of the application circuit 56. However, the assistance of a memory device and of voltage limiters can also be used to see to it that the regulator 57 and the application circuit 56 are protected against unfavorable consequences of the voltage step UF. The regulator 57 can be constructed in an extremely simple manner as warranted. A supply voltage that is adequately freed from the signal must be available at the output of the regulator 57 for the application circuit 56. The discriminator 58 can also be constructed in an extremely simple manner. An electrical voltage SE that the application circuit 56 can process as an input signal and on the basis of which it can produce an output signal, must merely be available at the output of the discriminator 58.

A capacitor for the intermediate storage of the signal can also serve as the voltage standard 59.

FIG. 20 illustrates an embodiment of the opto-electronic device 54 and of the interface 55 for that case in which the energy required for the operation of the device 2 is incident onto the same device 2 from the optical radiator in the form of the optical radiation 6. Details in FIGS. 20 and 21 that have the same function as in FIG. 19 are provided with the same reference characters as in FIG. 19.

The pads 66, 67, 68 are also used for the definition of stable reference potentials in the arrangement of FIG. 20. In the most simple case, an electronic switch 65 is used as a modulator 64 for the modulation of the output radiation 7. The electronic switch 65 is controlled by the output signal SA output by the application circuit 56. No additional voltage increase occurs in an arrangement of FIG. 20 when transmitting the optical radiation 7.

FIG. 21 illustrates an exemplary embodiment of an opto-electronic device 54 and an interface 55 in which a separate light-receiving semiconductor component device 69 is present in order to make available the energy required for outputting the optical radiation 7. Both the device 2 and the device 65 that serves for modulating the optical radiation 7 are thereby provided with energy by the device 69. The device 69 receives its energy from the optical radiation 5. The device 69 can be fashioned as a part of the light-receiving semiconductor component device 1. The device 69, however, can also be a separate photodiode array.

FIG. 22 illustrates a configuration of an autonomous photon-driven component 51 which includes an energy source 75 for the application circuit 56, an energy source 76 for the transmitter 2, a supply 77 with information for the receiver 79 and the information output 78 from the transmitter 2.

A plurality of pads 70–73 are again employed for the definition of stable reference potentials.

The optical radiation 5 can contain a reference or power spectrum 80 for outputting energy to the devices 1, 69 and a frequency spectrum 81 for outputting the information (signal) to the optical receiver 79. The optical receiver 79 can be an individual, separate photodiode. So that the receiver 79 cannot be switched by the spectrum 80, an optical filter 74 is employed that sees to it that the receiver 79 is only switched by the spectrum 81. The receiver 79 is converted into an electrical signal in a device 82 that the application circuit 56 can process as an input signal SE. The device 82 can comprise a preamplifier and a discriminator.

Figure 24:
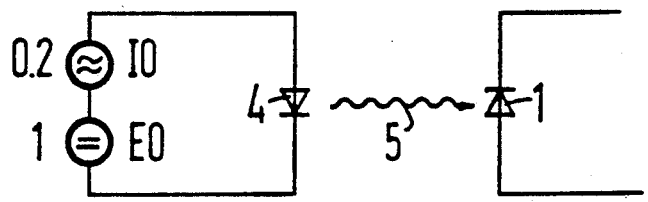
FIG. 24 is a schematic circuit diagram of an optical transmitter and receiver constructed in accordance with the present invention.
Figure 25:
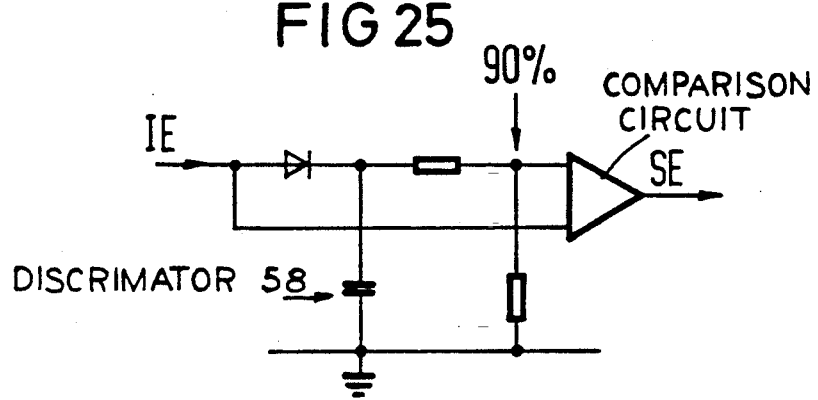
FIG. 25 is a schematic circuit diagram of a signal discriminator.

FIGS. 23–25 explain the principle of demodulating the optical radiation 5.

FIG. 23 shows the electrical signal IE appearing at the output of the device 1. As shown, the signal IE is an amplitude-modulated signal. The signal IE has a fundamental frequency $f_0$.

An output signal IE of the device 1 shown in FIG. 23 occurs, for example, when a device of FIG. 24 has been used. The optical radiator 4 is thereby supplied with a voltage that occurs by a superposition of 100% dc voltage EO with 20% signal voltage IO. These superposed voltages lead to the output of the optical radiation 5 at the device 1.

FIG. 25 illustrates a circuit for a discriminator 58. The electrical voltage appearing at the output of the device 1 thereby experiences a peak value formation with the assistance of a capacitor, whereupon the input level is reduced to 90% of the maximum amplitude of the voltage appearing at the output of the device 1 by the resistive divider. When the signal appearing at the output of the device 1 is greater than this new level of 90%, then the electrical input signal SE for the application circuit 56 receives the first level at the output of a comparison circuit; when the signal at the output of the device 1 is less than the 90% level, then the electrical input signal SE for the application circuit 56 receives the other level of a digital input signal SE at the output of the comparison circuit. The regulator 57 outputs the dc voltage UC of, for example, 5 V given a current of 8 mA to the application circuit 56.

The signal at the output of the device 1 has a frequency $f_0$. A signal for the modulator 64 can be derived from this frequency $f_0$ for modulating the optical signal 7. A frequency-defining element for the modulation of the optical signal 7 can thus be eliminated. The frequency $f_0$ of the optical radiation 5 can also be used for deriving a clock signal for the application circuit 56.

The electrical circuit 3 can comprise a memory for processing the input signal. The input signal can be stored unmodified or modified in a memory. The electrical circuit 3 may also comprise a microcomputer. The electrical circuit 3 serves for information processing. The electrical circuit 3 may also serve for the non-volatile storage of data.

Figure 26:
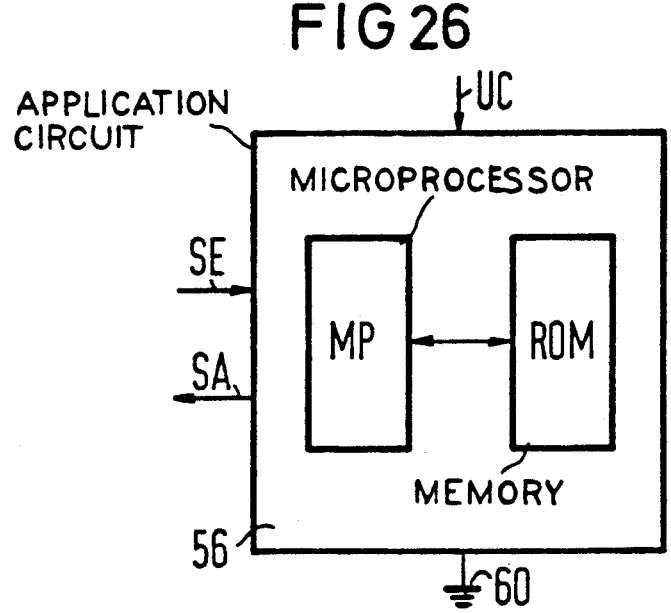
FIG. 26 is a schematic representation illustrating an application circuit comprising a read only memory and a microprocessor.

FIG. 26 shows an application circuit 56 having a memory ROM. A microprocessor MP may also be provided in addition to the memory ROM (ROM, PROM). A non-volatile memory (EPROM, $E^2$PROM) is preferably employed.

The microprocessor MP and the memory $E^2$PROM can be executed in complementary-metal-oxide-semiconductor (CMOS) technology.

United States Letters Patent 4,650,981 and the Patent Cooperation Treaty patent applications WO 86/04705 and WO 87/06375 disclose identification cards and the contents of these documents are fully incorporated herein by this reference.

The conversion efficiency of optical energy into electrical energy is extremely high given photodiodes. When a monochromatic source is employed as a source for the optical radiation, then the wavelength of the optical radiation can be placed extremely close to the absorption edge given utilization of a photodiode as a receiver of the optical radiation. The difference between the energy $E_G$ that corresponds to the band gap of the radiation receiver and the energy of the optical radiation $E_Q$ can be kept extremely low in this manner. An extremely high efficiency in the conversion of optical energy into electrical energy by the radiation receiver occurs as a result thereof. An optimum utilization of the optical radiation occurs as a result thereof.

Given the utilization of a laser, the source of the optical radiation can be ideally adapted to the light receiver. Given formation of the light receiver from the compound semiconductor material, for example GaAs, the wavelength of the laser can be selected to be between 780 nm and 830 nm. A difference between the wavelength of the laser and the absorption edge of the receiver of 50 nm and less is therefore obtained. It is advantageous when a difference of less than 100 nm is present between the wavelength of the optical radiation and the absorption edge of the light receiver.

A photon-driven component with a monolithic structure is advantageous. Given formation of the photon-driven component using a compound semiconductor material, means for transmitting an optical signal as well as means for receiving optical energy and an optical signal can be monolithically integrated in this manner. A photon-driven component that can both transmit as well as receive with high power and at high frequency is obtained in this manner. A power laser is thereby advantageously employed as the optical radiator 4.

The optical filter is provided in various exemplary embodiments and can also be integrated on the semiconductor material. Dielectric filters that are composed of alternating layer sequences of dielectric materials are suitable for this purpose. For example, such filters are disclosed in the German published application 26 37 616.

Undesired luminescence effects in a photo-driven component can be kept small in that there is optimum surface wherein the photo-electric charge carriers in short-circuit operation are separated by the electrical field of a on junction or of a Schottky junction or of some other electrical field. This can be achieved with a suitable structure of the component. For example, the pn junction (23-16 in FIG. 4) can be optimally close to the surface, can enable an optimally-long life span of the charge carriers and can occupy an optimally-large area parallel to the surface of the component (potentially contacting the layer 16 extending from below) so that the charge carriers in the short-circuit operation can reach the p zones, or, respectively, D zones as fast as possible and recombine as little as possible in an emitting fashion. The photon-driven charge carriers can also be additionally controlled by a suitable arrangement of contacts. The occurrence of noise signals as a consequence of undesired luminescence effects can thereby be prevented. When the light-transmitting device of the photon-driven component is operated in a short-circuit manner, optimally little luminescence should occur.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

we claim:

1. A self-sufficient photon-driven device comprising:
   a substrate made of compound semiconductor material;
   light-receiving first means monolithically integrated on said substrate for receiving optical energy and optical signals and converting the optical energy and optical signals into tappable electrical energy and electrical signals, said light-receiving first means comprising a plurality of serially-connected photodiodes;
   light-transmitting second means also monolithically integrated on said substrate, said light-transmitting second means comprising a light-emitting diode;
   means for interconnecting the first and second means so that, when interconnected, said second means is powered solely by said tappable electrical energy, and converts said electrical signals into outgoing optical signals; and
   third means including an electrical circuit connected to said interconnection means and between said photodiodes and said light emitting diode for receiving the electrical energy and the electrical signals from the photodiode and for feeding the electrical signals to said light emitting diode wherein said electrical circuit of said third means comprises modulating means operable to modulate the light emitted by said light emitting diode by chronologically alternating the operation of and short-circuit operation of said light emitting diode.

2. A self-sufficient photon-driven device comprising:
   a substrate made of compound semiconductor material;
   light-receiving first means monolithically integrated on said substrate for receiving optical energy and optical signals and converting the optical energy and optical signals into tappable electrical energy and electrical signals, said light-receiving first means comprising a plurality of serially-connected photodiodes:
   light-transmitting second means also monolithically integrated on said substrate, said light-transmitting second means comprising a light-emitting diode;
   means for interconnecting the first and second means so that, when interconnected, said second means is powered solely by said tappable electrical energy, and converts said electrical signals into outgoing optical signals; and
   third means including an electrical circuit connected to said means for interconnecting and between said photodiodes and said light-emitting diode for receiving the electrical energy and the electrical signals from the photodiodes and for feeding the electrical signals to said light-emitting diode; wherein said means for interconnecting comprises three electrical terminals respectively connected between said electrical circuit and one end of said serially connected photodiodes, one end of said light-emitting diode and a connection between another end of said light-emitting diode with another end of said serially-connected photodiodes.

3. A self-sufficient photon-driven device comprising:
   a substrate made of compound semiconductor material;
   light-receiving first means monolithically integrated on said substrate for receiving optical energy and optical signals and converting the optical energy and optical signals into tappable electrical energy and electrical signals, said light-receiving first means comprising a plurality of serially-connected photodiodes;
   light-transmitting second means also monolithically integrated on said substrate, said light-transmitting second means comprising a light-emitting diode;
   means for interconnecting the first and second means so that, when interconnected, said second means is powered solely by said tappable electrical energy, and converts said electrical signals into outgoing optical signals;
   third means including an electrical circuit connected between said first means and said second means for receiving the electrical energy and the electrical signals and for feeding the electrical signals to said second means; and three electrical terminals respectively connected between said electrical circuit and said series of photodiodes and said light-emitting diode.

4. A self-sufficient photon-driven device comprising:
a substrate made of compound semiconductor material;
light-receiving first means monolithically integrated on said substrate for receiving optical energy and optical signals and converting the optical energy and optical signals into tappable electrical energy and electrical signals, said light-receiving first means comprising a plurality of serially-connected photodiodes;
light-transmitting second means also monolithically integrated on said substrate, said light-transmitting second means comprising a light-emitting diode; and
means for interconnecting the first and second means so that, when interconnected, said second means is powered solely by said tappable electrical energy, and converts said electrical signals into outgoing optical signals wherein said substrate is a semi-insulating substrate.

5. A self-sufficient photon-driven device comprising:
a substrate made of compound semiconductor material;
light-receiving first means monolithically integrated on said substrate for receiving optical energy and optical signals and converting the optical energy and optical signals into tappable electrical energy and electrical signals, said light-receiving first means comprising a plurality of serially-connected photodiodes;
light-transmitting second means also monolithically integrated on said substrate, said light-transmitting second means comprising a light-emitting diode; and
means for interconnecting the first and second means so that, when interconnected, said second means is powered solely by said tappable electrical energy, and converts said electrical signals into outgoing optical signals wherein said light-receiving first means and said light-transmitting second means comprise a layer of semiconductor material carried on said substrate.

6. The photon-driven device of claim 6, wherein:
said layer of semiconductor material includes diffusions therein dividing said layer into zones defining the laterial limits of said photodiodes and said light emitting diode.

7. The photon-drive device of claim 5, wherein:
said layer of semiconductor material includes trenches etched therein to divide said layer of semiconductor material into zones which define the lateral limits of said photodiodes and said light emitting diode.

8. A self-sufficient photon-driven device comprising:
a substrate made of compound semiconductor material;
light-receiving first means monolithically integrated on said substrate for receiving optical energy and optical signals and converting the optical energy and optical signals into tappable electrical energy and electrical signals, said light-receiving first means comprising a plurality of serially-connected photodiodes;
light-transmitting second means also monolithically integrated on said substrate, said light-transmitting second means comprising a light-emitting diode;
means for interconnecting the first and second means so that, when interconnected, said second means is powered solely by said tappable electrical energy, and converts said electrical signals into outgoing optical signals; and
means on said substrate for reducing bulk resistance of said device.

9. A self-sufficient photon-driven device comprising:
a substrate made of compound semiconductor material;
light-receiving first means monolithically integrated on said substrate for receiving optical energy and optical signals and converting the optical energy and optical signals into tappable electrical energy and electrical signals, said light-receiving first means comprising a plurality of serially-connected photodiodes;
light-transmitting second means also monolithically integrated on said substrate, said light-transmitting second means comprising a light-emitting diode;
means for interconnecting the first and second means so that, when interconnected, said second means is powered solely by said tappable electrical energy, and converts said electrical signals into outgoing optical signals; and
reflecting means carried on said device on a side of said device.

10. A self-sufficient photon-driven device comprising:
a substrate made of compound semiconductor material;
light-receiving first means monolithically integrated on said substrate for receiving optical energy and optical signals and converting the optical energy and optical signals into tappable electrical energy and electrical signals, said light-receiving first means comprising a plurality of serially-connected photodiodes;
light-transmitting second means also monolithically integrated on said substrate, said light-transmitting second means comprising a light-emitting diode;
means for interconnecting the first and second means so that, when interconnected, said second means is powered solely by said tappable electrical energy, and converts said electrical signals into outgoing optical signals; and
an optical anti-reflection layer thereon.

11. A self-sufficient photon-driven device comprising:
a substrate made of compound semiconductor material;
light-receiving first means monolithically integrated on said substrate for receiving optical energy and optical signals and converting the optical energy and optical signals into tappable electrical energy and electrical signals, said light-receiving first means comprising a plurality of serially-connected photodiodes;
light-transmitting second means also monolithically integrated on said substrate, said light-transmitting second means comprising a light-emitting diode;
means for interconnecting the first and second means so that, when interconnected, said second means is powered solely by said tappable electrical energy, and converts said electrical signals into outgoing optical signals; and a layer on a surface of said device for reducing surface recombination.

12. A self-sufficient photon-driven device comprising;

a substrate made of compound semiconductor material;

light-receiving first means monolithically integrated on said substrate for receiving optical energy and optical signals and converting the optical energy and optical signals into tappable electrical energy and electrical signals, said light-receiving first means comprising a plurality of serially-connected photodiodes;

light-transmitting second means also monolithically integrated on said substrate, said light-transmitting second means comprising a light-emitting diode;

means for interconnecting the first and second means so that, when interconnected, said second means is powered solely by said tappable electrical energy, and converts said electrical signals into outgoing optical signals;

third means including an electrical circuit connected to said interconnection means and between said photodiodes and said light emitting diode for receiving the electrical energy and the electrical signals from the photodiode and for feeding the electrical signals to said light emitting diode; and a portion of said device comprising at least one part of said electrical circuit.

13. A self-sufficient photon-driven device comprising:

a substrate made of compound semiconductor material;

light-receiving first means monolithically integrated on said substrate for receiving optical energy and optical signals and converting the optical energy and optical signals into tappable electrical energy and electrical signals, said light-receiving first means comprising a plurality of serially-connected photodiodes;

light-transmitting second means also monolithically integrated on said substrate, said light-transmitting second means comprising a light-emitting diode;

means for interconnecting the first and second means so that, when interconnected, said second means is powered solely by said tappable electrical energy, and converts said electrical signals into outgoing optical signals; and a layer of transparent plastic covering said device.

14. A self-sufficient photon-driven device comprising;

a substrate made of compound semiconductor material;

light-receiving first means monolithically integrated on said substrate for receiving optical energy and optical signals and converting the optical energy and optical signals into tappable electrical energy and electrical signals, said light-receiving first means comprising a plurality of serially-connected photodiodes;

light-transmitting second means also monolithically integrated on said substrate, said light-transmitting second means comprising a light-emitting diode;

means for interconnecting the first and second means so that, when interconnected, said second means is powered solely by said tappable electrical energy, and converts said electrical signals into outgoing optical signals; and a layer of optical sealing material partially covering said device.

15. A photoelectric system comprising:

a light transmitter for transmitting optical energy and optical signals;

a self-sufficient photon-driven device comprising a substrate made of compound semiconductor material, light-receiving first means for receiving the optical energy and the optical signals and converting the optical energy and the optical signals into tappable electrical energy and electrical signals, said light-receiving first means comprising a plurality of series-connected photo diodes monolithically integrated on said substrate, and light-transmitting second means monolithically integrated on said substrate and coupled to said light-receiving first means for converting the electrical signals into outgoing optical signals, said light-transmitting second means comprising at least one light-emitting diode;

a light receiver for receiving and utilizing said outgoing optical signals; and filter means between said light transmitter and said light-receiving first means for separating the optical energy having a first spectrum from the optical signals having a second spectrum.

16. An optical communication system comprising:

a reader for reading information, said reader including a first housing including a slot therein, said slot including first and second opposed walls, an optical transmitter mounted in said first wall of said first housing and operable to emit optical energy and an optical signal, and an optical receiver mounted in said first wall of said first housing spaced from said optical transmitter for receiving optical information signals;

an information member containing information concerning a specific entity, which information member is removably received within said slot of said reader;

said information member comprising a second housing which is removably received in said slot of said first housing, said information member including a light receiver mounted in said second housing so as to be positioned adjacent said optical transmitter, when said information member is received within said slot, for receiving the optical energy emitted by said optical transmitter and converting the optical energy into electrical energy and the optical signal into an electrical signal;

circuit means mounted in said second housing and operatively connected to said light receiver so as to be powered by the electrical energy and operated by the electrical signal to produce electrical information signals; and a light transmitter mounted in said second housing spaced said predetermined distance from said light receiver, said light transmitter being connected to said circuit means and operable to convert said electrical information signals into the optical information signals and transmit same to said optical receiver.

17. An optical communication system comprising:

a reader for reading information, said reader including a first housing including a slot therein, said slot including first and second opposed walls, an optical transmitter mounted in said first wall of said first housing and operable to emit optical energy and an optical signal, and an optical receiver mounted in said second wall of said first housing spaced a predetermined distance from said optical transmitter for receiving optical information signals;

an information member containing information concerning a specific entity which information member is removably received with said slot, said information member comprising a second housing which is removably received in said slot of said first housing and including a light receiver mounted in said second housing so as to be positioned adjacent said optical transmitter, when said information member is received within said slot, for receiving and converting the optical energy into electrical energy and the optical signal into an electrical signal;

circuit means mounted in said second housing operatively connected to said light receiver so as to be powered by the electrical energy and operated by the electrical signal to produce electrical information signals; and a light transmitter mounted in said second housing spaced said predetermined distance from said light receiver connected to said second means and operable to convert the electrical information signals into the optical information signals and transmit same to said optical receiver.

18. An optical communications system comprising:

a reader for reading information, said reader including a first housing including a slot therein, said slot including first and second opposed walls and a bottom wall, an optical transmitter mounted in said bottom wall of said slot of said first housing and operable to emit optical energy and an optical signal, and an optical receiver mounted in said bottom wall of said slot of said first housing spaced said predetermined distance from said optical transmitter for receiving the optical information signals;

an information member containing information concerning a specific entity, which information member is removably received within said slot.

said information comprising a second housing which is removably received in said slot of said first housing, said information member including a light receiver mounted in said second housing so as to be positioned adjacent said optical transmitter for receiving the optical signal and the optical energy emitted by the optical transmitter and converting the optical energy into electrical energy and the optical signal into an electrical signal;

circuit means mounted in said second housing operatively connected to said light receiver so as to be powered by the electrical energy and operated by the electrical signal to produce electrical information signals;

a light transmitter mounted in said second housing spaced said predetermined distance from said light receiver connected to said circuit means and operable to convert the electrical information signals into the optical information signals and transmit same to said optical receiver.

19. An optical communications system comprising:

a reader for reading information, said reader including a first housing including a slot therein, said slot being defined by and including first and second opposed walls of said housing;

a first optical transmitter mounted in said first wall of said slot of said housing and operable to emit optical energy;

a second optical transmitter mounted in said first wall of said slot of said housing spaced from said first optical transmitter and operable to emit an optical signal;

an optical receiver mounted in said first wall of said slot of said housing spaced a predetermined distance from said second optical transmitter for receiving optical information signals;

an information member containing information concerning a specific entity, which information member is removably received within said slot, said information member comprising a second housing which is removably received in said slot of said first housing and which includes a light receiver mounted in said second housing so as to be positioned adjacent said first and second optical transmitters for receiving the optical energy and the optical signal and converting the optical energy into electrical energy and the optical signal into an electrical signal;

circuit means mounted in said second housing operatively connected to said light receiver so as to be powered by the electrical energy and operated by the electrical signal to produce electrical information signals; and a light transmitter mounted on said second housing spaced said predetermined distance from said light receiver so as to be positioned in registry with said optical means when said information member is received within said slot, said light transmitter being connected to said circuit means and operable to convert the electrical information signals into the optical information signals and transmit same to said optical receiver.

* * * * *